US008882945B2

(12) United States Patent
Joly et al.

(10) Patent No.: US 8,882,945 B2
(45) Date of Patent: *Nov. 11, 2014

(54) ISOBUTYLENE (CO)POLYMERIC ADHESIVE COMPOSITION

(71) Applicant: 3M Innovative Properties Company, St. Paul, MN (US)

(72) Inventors: Guy D. Joly, Shoreview, MN (US); Leon Levitt, Mendota Heights, MN (US); Vivek Bharti, Cottage Grove, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/182,741

(22) Filed: Feb. 18, 2014

(65) Prior Publication Data

US 2014/0162517 A1 Jun. 12, 2014

Related U.S. Application Data

(62) Division of application No. 13/282,513, filed on Oct. 27, 2011, now Pat. No. 8,663,407.

(60) Provisional application No. 61/414,492, filed on Nov. 17, 2010.

(51) Int. Cl.
*B29C 65/00* (2006.01)
*B32B 27/00* (2006.01)
*C08L 33/00* (2006.01)
*C08L 33/02* (2006.01)
*C09J 123/22* (2006.01)
*C09J 7/02* (2006.01)
*C08L 23/36* (2006.01)
*C08L 33/06* (2006.01)
*C08K 5/00* (2006.01)

(52) U.S. Cl.
CPC .............. *C09J 7/021* (2013.01); *C08L 23/36* (2013.01); *C09J 123/22* (2013.01); *C08L 33/064* (2013.01); *C08K 5/0016* (2013.01)
USPC .............. 156/60; 156/332; 524/523; 525/221

(58) Field of Classification Search
CPC ... C08L 23/36; C08L 33/064; C08L 2666/02; C09J 123/22; C09J 7/021; C08K 5/0016
USPC ................ 156/332, 60; 524/523; 525/221
See application file for complete search history.

(56) References Cited

U.S. PATENT DOCUMENTS

| 2,803,615 | A | 8/1957 | Ahlbrecht et al. |
| 3,842,059 | A | 10/1974 | Milkovich et al. |
| 4,181,752 | A | 1/1980 | Martens et al. |
| 4,329,384 | A | 5/1982 | Vesley et al. |
| 4,378,250 | A | 3/1983 | Treadway et al. |
| 4,619,979 | A | 10/1986 | Kotnour et al. |
| 4,732,808 | A | 3/1988 | Krampe et al. |
| 4,843,134 | A | 6/1989 | Kotnour et al. |
| 5,204,219 | A | 4/1993 | Van Ooij et al. |
| 5,459,174 | A | 10/1995 | Merrill et al. |
| 5,464,900 | A | 11/1995 | Stofko, Jr. et al. |
| 5,468,353 | A | 11/1995 | Anich et al. |
| 5,567,775 | A | 10/1996 | Wang et al. |
| 5,602,221 | A | 2/1997 | Bennett et al. |
| 5,639,546 | A | 6/1997 | Bikadi |
| 5,650,261 | A | 7/1997 | Winkle |
| 5,852,148 | A | 12/1998 | Behr et al. |
| 6,063,838 | A | 5/2000 | Patnode et al. |
| 6,380,149 | B2 | 4/2002 | Flynn et al. |
| 6,630,238 | B2 | 10/2003 | Hyde et al. |
| 6,632,522 | B1 | 10/2003 | Hyde et al. |
| 6,664,354 | B2 | 12/2003 | Savu et al. |
| 6,861,139 | B2 | 3/2005 | Takeda |
| 8,530,578 | B2 | 9/2013 | Bharti et al. |
| 8,597,784 | B2 | 12/2013 | Lee et al. |
| 8,629,209 | B2 | 1/2014 | Lee et al. |
| 8,663,407 | B2 * | 3/2014 | Joly et al. .................. 156/60 |
| 8,673,996 | B2 | 3/2014 | Lee et al. |
| 2003/0091816 | A1 | 5/2003 | Takeda |
| 2009/0281002 | A1 | 11/2009 | Casper |
| 2011/0073901 | A1 | 3/2011 | Fujita |
| 2011/0105637 | A1 | 5/2011 | Fujita |
| 2011/0282010 | A1 | 11/2011 | Fujita |
| 2012/0122359 | A1 | 5/2012 | Lee et al. |
| 2012/0208013 | A1 | 8/2012 | Clapper et al. |
| 2012/0285618 | A1 | 11/2012 | Bharti et al. |
| 2013/0269932 | A1 | 10/2013 | Dams et al. |
| 2014/0014330 | A1 | 1/2014 | Dams et al. |

FOREIGN PATENT DOCUMENTS

| EP | 0 372 756 | 12/1993 |
| WO | WO 92/11295 | 7/1992 |
| WO | WO 2006/093702 | 9/2006 |
| WO | WO 2007/087281 | 8/2007 |
| WO | WO 2009/148722 | 12/2009 |
| WO | WO 2010/141248 | 12/2010 |
| WO | WO 2011/017298 | 2/2011 |
| WO | WO 2011/062851 | 5/2011 |
| WO | WO 2011/062852 | 5/2011 |

OTHER PUBLICATIONS

Abbate, et al., "Maleated Polyisobutylene: A Novel Toughener for Unsaturated Polyester Resins," Journal of Applied Polymer Science, vol. 58, Issue 10, pp. 1825-1837, (1995).

Shirai, et al., "Photoacid and photobase generators: Chemistry and applications to polymeric materials," Progress in Polymer Science, vol. 21, pp. 1-45, (1996).

Tachi, et al., "Photochemical Reactions of Quaternary Ammonium Dithiocarbamates as Photobase Generators and Their Use in the Photoinitiated Thermal Crosslinking of Poly(gycidylmethacrylate)," Journal of Polymer Science, Part A: Polymer Chemistry, vol. 39, Issue 9, pp. 1329-1341, (2001).

(Continued)

*Primary Examiner* — Liam J Heincer
*Assistant Examiner* — Marilou Lacap
(74) *Attorney, Agent, or Firm* — Kent S. Kokko

(57) ABSTRACT

Adhesive compositions are described comprising a) a nonfunctional isobutylene (co)polymer, b) an amine-functional poly(isobutylene) polymer, optionally an acid-functional (meth)acrylate copolymer, and optionally a tackifier.

14 Claims, No Drawings

(56) References Cited

OTHER PUBLICATIONS

Ranganathan, et al., "Peroxide-Initiated Grafting of Maleic Anhydride onto Linear and Branched Hydrocarbons," Journal of Polymer Science: Part A: Polymer Chemistry, vol. 37, Issue 20, pp. 3817-3825, (1999).

Heinen, et al., "C NMR Study of the Grafting of Maleic Anhydride onto Polyethene, Polypropene, and Ethene-Propene Copolymers," Macromolecules, vol. 29, Issue 4, pp. 1151-1157, (1996).

Shi, et al., "Functionalization of isotactic polypropylene with maleic anhydride by reactive extrusion: mechanism of melt grafting," Polymer, vol. 42, Issue 13, pp. 5549-5557, (2001).

Cameron, et al., "Photogeneration of Organic Bases from o-Nitrobenzyl-Derived Carbamates," Journal of the American Chemical Society, vol. 113, Issue 11, pp. 4303-4313, (1991).

Frechet, et al., "Photogenerated Amines and Diamines: Novel Curing Systems for Thin Film Coatings," J. Polym. Mater. Sci. Eng., vol. 64, pp. 55-56 (1991).

Cameron, et al., "Base catalysis in Imaging Materials. 1. Design and Synthesis of Novel Light-Sensitive Urethanes as Photoprecursors of Amines," The Journal of Organic Chemistry, vol. 55, Issue 23, pp. 5919-5922, (1990).

* cited by examiner

US 8,882,945 B2

ISOBUTYLENE (CO)POLYMERIC ADHESIVE COMPOSITION

CROSS REFERENCE TO RELATED APPLICATION

This application is a divisional of U.S. patent application Ser. No. 13/282,513, filed Oct. 27, 2011, now allowed, which claims the benefit of U.S. Provisional Patent Application No. 61/414492, filed Nov. 17, 2010, the disclosure of which is incorporated by reference herein in its entirety.

TECHNICAL FIELD

This invention relates to pressure-sensitive adhesives and adhesive sealants prepared from isobutylene copolymers, and tape articles prepared therefrom. The pressure-sensitive adhesives are characterized by exhibiting an overall balance of adhesive and cohesive characteristics and exceptional adhesion to low surface-energy substrates, and substrates subjected to wet, moist or humid environments.

BACKGROUND

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

There are a wide variety of pressure sensitive adhesive (PSA) materials available today that include natural crude or synthetic rubbers, block copolymers, and acrylic ester based polymeric compositions. Central to all PSAs is a desired balance of adhesion and cohesion that is often achieved by optimizing the physical properties of the adhesive, such as glass transition temperature and modulus. For example, if the glass transition temperature ($T_g$) or modulus of the elastomer is too high and above the Dahlquist criterion for tack (storage modulus of $3\times10^6$ dynes/cm$^2$ at room temperature and oscillation frequency of 1 Hz), the material will not be tacky and is not useful by itself as a PSA material. Often in this case, low molecular weight, high $T_g$ resin polymers (tackifiers) or low molecular weight, low $T_g$ polymers (plasticizers) are often used to modulate the $T_g$ and modulus into an optimal PSA range.

SUMMARY

The adhesive compositions of this disclosure comprise a) a non-functional isobutylene (co)polymer, b) an amine-functional poly(isobutylene) polymer, optionally an acid-functional (meth)acrylate copolymer, optionally a tackifier and optionally a plasticizer.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3\times10^6$ dynes/cm at a frequency of 1 Hz.

In some embodiments the disclosure provides pressure sensitive adhesives that adhere to surfaces in a wet, moist, or humid environment, so-called "wet-stick" adhesives, are useful in selected industrial, commercial and consumer applications. In pharmaceutical and other medical fields, such wet-stick adhesives are typically used for adhering articles such as tapes, bandages, dressings, and drapes to moist skin surfaces such as wounds or areas of the body prone to moistness. Wet-stick adhesives also find use in outdoor or exterior applications, such as on roadway materials, traffic-control signage, and marine or automotive coatings and surfaces. Labels for food containers and other products that are exposed to moisture due to condensation or subjected to water or ice immersion also must be coated with wet-stick adhesives. As used herein "wet-stick adhesive" refers to a material that exhibits pressure-sensitive adhesive properties when adhered to a substrate that has been subsequently exposed to water or high humidity.

In recent years, there has been a significant increase in the usage of low surface energy, olefin-based thermoplastics (e.g., polyethylene, polypropylene, ethylene propylene diene monomer rubber (EPDM)) in automotives, paints, appliances and electronics markets. The advantages of the new materials include affordable cost, easy processibility, and excellent mechanical properties. However, this trend creates a challenge in terms of making adhesive bonds to these low energy surfaces.

Recently, poly(isobutylene) (PIB) and other isobutylene copolymers (such as isobutylene-isoprene copolymers have been considered as an attractive material for low surface energy (LSE) bonding applications due to its excellent adhering properties on olefin-based thermoplastics. In addition, the excellent moisture and oxygen barrier properties of PIB suggest that PIB-based materials have potential use in electronic and photovoltaic encapsulation applications. In spite of its beneficial properties, low cohesive strength of the material has limited the uses for high shear applications. Another possible application for PIB-based material is in the medical adhesive field. Most acrylate-based PSAs are not suitable for medical application since acrylate PSAs tend to give off toxic vapors at elevated temperatures. Acrylate-based PSAs typically contain monomeric materials which, even at ordinary room temperatures, exude odors that make acrylate PSA tapes generally unsuitable for medical uses. Poly(isobutylene) PSAs are often used for medical uses because they are physiologically inert, but again they tend to be deficient in internal strength.

The adhesive compositions of the present disclosure provide an improved pressure-sensitive adhesive composition which may be adhered to a variety of substrates, including low surface-energy (LSE) substrates and substrates in a wet, moist, or humid environment, within a wide temperature range and provide good adhesive strength and holding characteristics. The adhesive compositions of the present disclosure further provide a pressure-sensitive adhesive article, such as adhesive tapes and sealants. In many embodiments the adhesives provide good barrier coatings, characteristic of many PIB polymers, but which may be cleanly removed from a substrate due to the high cohesive strength.

As used herein

"Alkyl" means a linear or branched, cyclic or acylic, saturated monovalent hydrocarbon having from one to about twelve carbon atoms, e.g., methyl, ethyl, 1-propyl, 2-propyl, pentyl, and the like.

"Alkylene" means a linear saturated divalent hydrocarbon having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Aryl" means a monovalent aromatic, such as phenyl, naphthyl and the like.

"Arylene" means a polyvalent, aromatic, such as phenylene, naphthalene, and the like.

"Aralkylene" means a alkylene defined above with an aryl group attached to the alkylene radical, e.g., benzyl, 1-naphthylethyl, and the like.

DETAILED DESCRIPTION

The adhesive compositions of this disclosure comprise a) a non-functional isobutylene (co)polymer, b) an amine-functional poly(isobutylene) polymer, optionally an acid-functional (meth)acrylate copolymer, optionally a tackifier and optionally a plasticizer. As used herein the term "isobutylene (co)polymer" refers to synthetic rubbers of isobutylene polymers and copolymers, and includes but not limited to poly (isobutylene) and isobutylene-isoprene copolymers.

The adhesive composition comprises at least one unfunctionalized isobutylene (co)polymeric synthetic rubber material. The unfunctionalized isobutylene (co)polymeric synthetic rubbers are generally resins having a polyisobutylene main or a side chain. In some embodiments, the isobutylene (co)polymers are substantially homopolymers of isobutylene, for example, poly(isobutylene) resins available under the tradenames OPPANOL (BASF AG) and GLISSOPAL (BASF AG). In some embodiments, the isobutylene (co)polymeric resins comprise copolymers of isobutylene, for example, synthetic rubbers wherein isobutylene is copolymerized with another monomer. Synthetic rubbers include butyl rubbers which are copolymers of mostly isobutylene with a small amount of isoprene, for example, butyl rubbers available under the tradenames VISTANEX (Exxon Chemical Co.) and JSR BUTYL (Japan Butyl Co., Ltd.). Synthetic rubbers also include copolymers of mostly isobutylene with n-butene or butadiene. In some embodiments, a mixture of isobutylene homopolymer and butyl rubber may be used, i.e., a first polyisobutylene comprises a homopolymer of isobutylene and the second polyisobutylene comprises butyl rubber, or a first polyisobutylene comprises butyl rubber and a second polyisobutylene comprises a homopolymer of isobutylene.

The unfunctionalized isobutylene (co)polymeric synthetic rubber (e.g. PIB) material typically has substantially higher molecular weight than the amine-functionalized (e.g. PIB) synthetic rubber material (described further below). In some embodiments, the weight average molecular weight ($M_w$) of the unfunctionalized isobutylene (co)polymeric synthetic rubber (e.g. PIB) is at least 35,000 grams per mole, at least 100,000 grams per mole, at least 250,000 grams per mole, at least 500,000 grams per mole, or even at least 1,000,000 grams per mole. The weight average molecular weight is typically no greater than 4,000,000 g/mole.

The unfunctionalized isobutylene (co)polymeric synthetic rubber can be a homopolymer, copolymer, or a mixture thereof. Copolymers can be random or block copolymers. Block copolymers can include the polyisobutylene sections in the main backbone, in a side chain, or in both the main backbone and a side chain of the polymer. The polyisobutylene material is typically prepared by polymerizing isobutylene alone or by polymerizing isobutylene plus additional ethylenically unsaturated monomers, such as isoprene, in the presence of a Lewis Acid catalyst such as aluminum chloride, boron trichloride (with titanium tetrachloride as a co-catalyst), or boron trifluoride.

Unfunctionalized isobutylene (co)polymeric rubbers are commercially available from several manufacturers. Homopolymers are commercially available, for example, under the trade designation OPPANOL (e.g., OPPANOL B10, B15, B30, B50, B80, B100, B150, and B200) from BASF Corp. (Florham Park, N.J.). These polymers often have a weight average molecular weight ($M_w$) in the range of about 35,000 to 4,000,000 grams per mole. Still other exemplary homopolymers are commercially available from United Chemical Products (UCP) of St. Petersburg, Russia in a wide range of molecular weights. For example, homopolymers commercially available from UCP under the trade designation SDG have a viscosity average molecular weight ($M_v$) in the range of about 35,000 to 65,000 grams per mole. Homopolymers commercially available from UCP under the trade designation EFROLEN have a viscosity average molecular weight ($M_v$) in the range of about 480,000 to about 4,000,000 grams per mole. Homopolymers commercially available from UCP under the trade designation JHY have a viscosity average molecular weight in the range of about 3000 to about 55,000 grams per mole. These homopolymers typically do not have reactive double bonds. It is appreciated that the unfunctionalized (e.g. PIB) synthetic rubber may have a very small concentration of reactive double bonds or other functional groups that are residual to the polymerization thereof. The concentration of such reactive double bonds or other functional groups is typically less than 5, 4, 3, or 2 mol %. Such olefinic unsaturations are also typically not suitable functional groups for formation of covalent bonds via free-radical polymerization.

The concentration of unfunctionalized isobutylene (co) polymeric synthetic rubber material in the pressure sensitive adhesive composition is typically greater than 50 wt. %, preferably greater than 60 wt. %, preferably 65 to 80 wt. %.

The adhesive composition further comprises an amine-functional poly(isobutylene) polymer. The amine functional group may be a terminal group. The amine functional group can form a hydrogen bond to (e.g. pendant carboxylic acid groups of) the acid groups of the acid functional copolymer. Hence, such functional groups do not form a covalent bond. Functional groups that have non-polar covalent bonds do not form hydrogen bonds.

In some embodiments, the amine-functionalized polyisobutylene polymer is an amine-functionalized homopolymer of isobutylene, i.e. a poly(isobutylene). In other embodiments, the functionalized polyisobutylene polymer may be a copolymer comprising isobutylene repeat units and a small amount of units derived from another monomer having amine functional groups such as, for example, amine-functional styrene, isoprene, butene, or butadiene. These copolymers are typically prepared from a monomer mixture that includes at least 70 weight percent, at least 75 weight percent, at least 80 weight percent, at least 85 weight percent, at least 90 weight percent, or at least 95 weight percent isobutylene based on the weight of monomers in the monomer mixture. Exemplary copolymers include isobutylene copolymerized with isoprene.

The amine-functional poly(isobutylene) may be of the general formula

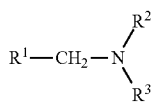

wherein
$R^1$ is a polymeric chain of isobutylene and other optional monomer units (as described supra), having 5 to 100 repeat units, and $R^2$ and $R^3$ are independently selected from H, $C_1$-$C_{10}$-alkyl or aryl groups.

The amine functionalized polyisobutylene is typically a liquid polymer having a relatively low to intermediate number average ($M_n$) molecular weight. The $M_n$ is typically at least 500 g/mole, 750 g/mole, or about 1,000 g/mole. In some embodiments, the $M_n$ of the functionalized polyisobutylene is no greater than 25,000 g/mole, or 10,000 g/mole, or 5,000 g/mole. In other embodiments, it is believed that a mixture of amine-functionalized poly(isobutylenes) having higher molecular weights will increase the peel values and reduce residue on removal.

The amine functionalized polyisobutylene typically has a glass transition temperature of no greater than about −30° C. or less, no greater than about −50° C., or no greater than about −65° C., as determined by differential scanning calorimetry (DSC).

The amine functional PIB may be prepared by the methods described in U.S. Pat. No. 4,832,702 (Kummer et al.) whereby a polyisobutylene is hydroformylated, then subjecting the resulting oxo product to a reductive amination, or a Mannich reaction. More particularly, amine-functional polyisobutylenes can be prepared by hydroformylating an appropriate polyisobutene with a rhodium or cobalt catalyst in the presence of CO and $H_2$ at temperatures from 80 to 200° C. and $CO/H_2$ pressures of up to 600 bar and then subjecting the oxo product to a Mannich reaction or amination under hydrogenating conditions. The amination reaction is advantageously carried out at 80 to 200° C. and under pressures up to 600 bar (60 MPa), preferably 80-300 bar.

In the preparation process, it is advantageous to use a suitable, inert solvent in order to reduce the viscosity of the reaction mixture. Particularly suitable solvents are aliphatic, cycloaliphatic and aromatic hydrocarbons having a low sulfur content. Aliphatic solvents which are free of sulfur compounds and contain less than 1% of aromatics are particularly preferred. They have the advantage that, at high amination temperatures, no heat of hydrogenation is liberated and no hydrogen is consumed. In the amination and hydroformulation reaction, the solvent content is from 0 to 70% by weight, depending on the viscosity of the polymer and of the solvent. Greater dilutions are just as uneconomical as a change of solvent between the oxo reaction and the amination.

In the process of Kummer et al., polybutene conversions of 80-90% can readily be achieved. The polybutene, which may comprise both butane and isobutene units, have, for example, a molecular weight $M_N$ of 300-5000, preferably 500-2500.

Various amine functionalized PIB materials are commercially available. For example, poly(isobutylene)amine ($M_n$) of about 1,000 grams/mole and a molar mass distribution $M_w/M_n$=1.6) is commercially available from BASF Corporation (Florham Park, N.J.) under the trade designation "Kerocom™ PIBA03".

The presence and concentration of amine functional groups within an amine-functionalized PIB material can be determined by Proton Nuclear Magnetic Resonance. Typically, the functionalized PIB material comprises at least 3 mol-% of amine functional groups. The concentration of amine functional groups is generally no greater than 10 mol-%.

The amount of amine functionalized PIB material in the adhesive composition can vary depending on the desired end use of the adhesive composition. Typically, however, the concentration of functionalized PIB material is 0.25 to 20 wt. %, preferably 1 to 15 wt. %, of an amine-functional poly(isobutylene) polymer, relative to the total adhesive composition, in order to improve adhesion with high surface energy substrates, such as glass or porcelain, in a wet, moist or humid environment. It has been found that the addition of small amounts of the amine-functional polyisobutylene to isobutylene (co)polymeric-based adhesives maintains the peel strength of bonded substrates exposed to wet or humid environments. Substrates bonded with tackified isobutylene (co) polymeric adhesives that do not contain amine-functionalized polyisobutylene show markedly reduced peel strengths when so exposed.

The adhesive composition may optionally further comprise an acid-functional (meth)acrylate copolymer comprising interpolymerized monomer units of (meth)acrylate ester monomers and acid-functional monomers.

The (meth)acrylate ester monomer useful in preparing the acid-functional (meth)acrylate adhesive copolymer is a monomeric (meth)acrylic ester of a non-tertiary alcohol, which alcohol contains from 1 to 14 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 2-propylheptanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth) acrylate ester monomer is the ester of (meth)acrylic acid with an alcohol derived from a renewable source, such as 2-octanol, citronellol, or dihydrocitronellol.

In some embodiments it is desirable for the (meth)acrylic acid ester monomer to include a high $T_g$ monomer, having a $T_g$ of at least 25° C., and preferably at least 50° C. Suitable high Tg monomers include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

The (meth)acrylate ester monomer is present in an amount of 85 to 99.5 parts by weight based on 100 parts total monomer content used to prepare the polymer. Preferably (meth) acrylate ester monomer is present in an amount of 90 to 99 parts by weight based on 100 parts total monomer content. When high Tg monomers are included, the copolymer may include up to 30 parts by weight, preferably up to 20 parts by weight of the 85 to 99.5 parts by weight of (meth)acrylate ester monomer component.

The polymer further comprises an acid functional monomer, where the acid functional group may be an acid per se, such as a carboxylic acid, or a portion may be a salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid-functional monomers of the acid-functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer is generally used in amounts of 0.5 to 15 parts by weight, preferably 0.5 to 10 parts by weight, based on 100 parts by weight total monomer of the acid functional copolymer.

Optional polar monomers useful in preparing the copolymer are both somewhat oil soluble and water soluble, resulting in a distribution of the polar monomer between the aqueous and oil phases in an emulsion polymerization. As used herein the term "polar monomers" are exclusive of acid functional monomers.

Representative examples of suitable polar monomers include but are not limited to 2-hydroxyethyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl(meth)acrylate, 2-ethoxyethyl(meth)acrylate, 2-methoxyethoxyethyl(meth)acrylate, 2-methoxyethyl methacrylate, polyethylene glycol mono(meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone. The polar monomer may be present in amounts of 0 to 10 parts by weight, and in some embodiments 0.5 to 5 parts by weight, based on 100 parts by weight total monomers of the acid functional copolymer.

Optional vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid-functional monomers, acrylate ester monomers and polar monomers. Such vinyl monomers are generally used at 0 to 5 parts by weight, and in some embodiments at 1 to 5 parts by weight, based on 100 parts by weight total monomer of the acid functional copolymer.

In such embodiments, the (meth)acrylic copolymer may comprise:
 i. 80 to 99.5 parts by weight of a (meth)acrylic acid ester of a non-tertiary alcohol;
 iii. 0.5 to 15 parts by weight of an acid functional ethylenically unsaturated monomer;
 iv. 0 to 10 parts by weight of a non-acid functional, ethylenically unsaturated polar monomer;
 v. 0 to 5 parts vinyl monomer; and
 vi. 0 to 5 parts of a multifunctional (meth)acrylate;
 based on 100 parts by weight total monomer of the (meth) acrylate ester copolymer or the acid functional copolymer.

In order to increase cohesive strength of the coated adhesive composition, a multifunctional (meth)acrylate may be incorporated into the blend of polymerizable monomers. Multifunctional acrylates are particularly useful for emulsion or syrup polymerization. Examples of useful multifunctional (meth)acrylates include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth) acrylate, and mixtures thereof. The amount and identity of multifunctional (meth)acrylate is tailored depending upon application of the adhesive composition. Typically, the multifunctional (meth)acrylate is present in amounts less than 5 parts based on total dry weight of the adhesive composition. More specifically, the crosslinker may be present in amounts from 0.01 to 5 parts, or 0.05 to 1 parts, based on 100 parts total monomers of the acid functional copolymer.

The adhesive composition generally comprises 0 to 10 wt. % of acid-functional (meth)acrylate copolymer. The addition of small amounts of acid-functional (meth)acrylate copolymer, i.e. less than 10 wt. % improves the bond strength to polar substrates. Above about 10 wt. %, the adhesive composition may leave an undesirable residue on removal, or render the bond permanent. The adhesives of the disclosure may advantageously be removed from a substrate and leave no obvious residue. In certain embodiments, the adhesive composition may comprise 0.5 to 5 wt. % acid-functional (meth) acrylate copolymer.

Conventional adhesives do not adhere well to certain substrates, such as certain types of automotive paints and low energy surfaces. Efforts have been made to improve the adhesion of adhesives, i.e., develop more aggressive tack, to these types of surfaces; tackifying the base polymer is commonly practiced. Various types of tackifiers include phenol-modified terpenes, hydrocarbon resins such as polyvinyl cyclohexane and poly(t-butyl styrene), and rosin esters such as glycerol esters of rosin and pentaerythritol esters of rosin.

Various types of tackifiers include phenol-modified terpenes and rosin esters such as glycerol esters of rosin and pentaerythritol esters of rosin that are available under the trade names Nuroz™, Nutac™ (Newport Industries), Permalyn™, Staybelite™, Foral™ (Eastman). Also available are hydrocarbon resin tackifiers that typically come from C5 and C9 monomers by-products of naphtha cracking and are available under the trade names Piccotac™, Eastotac™, Regalrez™, Regalite™ (Eastman), Arkon™ (Arakawa), Norsolene™, Wingtack™ (Cray Valley), Nevtack, LX (Neville Chemical Co.), Hikotack™, Hikorez™ (Kolon Chemical), Novares™ (Rutgers N.V.), Quintone™ (Zeon), Escorez™ (Exxonmobile Chemical), Nures™, and H-Rez™ (Newport Industries).

In many embodiments, the present disclosure provides tackified adhesive compositions that overcome problems noted in the art. The tackifier is preferably selected from a material that is essentially free of any ethylenically or acetylenically unsaturated bonds. The tackifier includes, but is not limited to, hydrogenated rosin resins, hydrogenated and esterified rosin resins, hydrogenated terpene resins, aliphatic petroleum resins, aromatic petroleum resins, alicyclic petroleum resins obtained by hydrogenating aromatic petroleum resins, and the like. Preferably, the tackifier used is selected from hydrogenated $C_9$ petroleum resins such as but not limited to Escorez™ tackifiers (ExxonMobile), Regalrez™ tackifiers (Eastman) or Arkon™ (Arakawa) tackifiers. Such "hydrophobic tackifiers", may be used in the adhesive composition in amounts of 0 to 40 wt. % of a tackifier, preferably 1 to 40 wt. %, relative to the total weight of the adhesive composition. In certain preferred embodiments, the combined amount of amine-functional PIB and tackifier is 25 to 35 wt. %.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid poly(isobutylenes) such as Glissopal™, and the like, waxes, and mixtures of oils. A plasticizer may be present in the pressure-sensitive adhesive of the present invention in an amount of from 0 to about 200 parts by weight per 100 parts by weight of the adhesive composition.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, ethylene vinyl acetate (EVA), polyvinyl chloride, polyester (polyethylene terephthalate), polycarbonate, polymethyl(meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The substrate is selected depending on the particular application in which it is to be used. For example, the adhesive can be applied to films, sheeting products, (e.g., decorative graphics and reflective products), label stock, and tape backings Additionally, the adhesive may be applied directly onto a substrate such as an automotive panel, or a glass window so that another substrate or object can be attached to the panel or window.

The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Low-energy substrates such as polypropylene typically have a surface energy of greater than about 20 dynes/cm. Included among such materials are polypropylene, polyethylene (e.g., high density polyethylene or HDPE), polystyrene and poly(methyl methacrylate) (PMMA). Other substrates may also have properties of low surface energy due to a residue, such as an oil residue or a film such as paint, being on the surface of the substrate.

However, even though the present adhesive bonds well to low surface-energy surfaces, the invention is not limited to being bonded to low surface-energy substrates, as it has been found that the inventive adhesive can also bond well to higher surface-energy substrates such as, for example, other plastics, ceramics, porcelains, glass and metals. In particular, the adhesive composition may be used to bond to high energy surface substrates that are exposed to moisture or high humidity. It has been found that the bonded substrates maintain significant/adequate peel strength even after such exposures.

The pressure-sensitive adhesives of the present invention that adhere to surfaces in wet, moist, or humid environments are useful in many industrial, commercial and consumer applications. These wet stick adhesives are potentially useful in applications involving bonding to surfaces that are exposed to wet, moist, or humid conditions. Such surfaces are commonly found in the bathroom, including surfaces within a shower or tub. These wet stick adhesives may also be useful in medical applications, such as tapes, bandages, dressings, and drapes to adhere to moist skin surfaces such as wounds or areas of the body prone to moistness. Additionally, wet stick adhesives also find use in outdoor or exterior applications, such as on roadway materials, traffic-control signage, outdoor masking tapes, outdoor duct tapes, and marine or automotive coatings and surfaces. Furthermore, labels for food containers and other products that are exposed to moisture due to condensation or subjected to water or ice immersion also must be coated with wet-stick adhesives.

The adhesive can also be provided in the form of a pressure-sensitive adhesive transfer tape in which at least one layer of the adhesive is disposed on a release liner for application to a secondary substrate at a later time. The adhesive can also be provided as a single-coated or double-coated tape in which the adhesive is disposed on a permanent backing Backings can be made from plastics (e.g., polypropylene, including biaxially oriented polypropylene, vinyl, polyethylene, ethylene vinyl acetate (EVA), polyester such as poly (ethylene terephthalate), nonwovens (e.g., papers, cloths, nonwoven scrims), metal foils, foams (e.g., polyacrylic, polyethylene, polyurethane, neoprene), and the like.

Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference. Those skilled in the art will also know that other additives such as fillers, antioxidants, stabilizers, and colorants may be blended with the adhesive for beneficial properties.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double-coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double-coated tapes are typically carried on a release liner.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

EXAMPLES

The following, non-limiting, examples further describe exemplary adhesives and adhesive articles of the present disclosure, as well as exemplary methods for making such adhesives and adhesive articles. All percents are by weight unless otherwise indicated. Solvents and other reagents used were obtained from Aldrich Chemical Company, Milwaukee, Wis. unless otherwise noted.

TABLE 1

Materials

| No. | Material | Function | Manufacturer |
|---|---|---|---|
| M0 | OPPANOL B30, polyisobutylene with Mv $2.0 \times 10^5$ g/mole | A medium molecular weight Polyisobutylene | BASF Corporation, Florham park, NJ |
| M1 | OPPANOL B150, polyisobutylene with Mv $2.5 \times 10^6$ g/mole | A medium molecular weight Polyisobutylene | BASF |
| M2 | OPPANOL B100, polyisobutylene with Mv $1.1 \times 10^6$ g/mole | A medium molecular weight Polyisobutylene | BASF |
| M3 | OPPANOL B50, polyisobutylene with Mv $3.4 \times 10^5$ g/mole | A medium molecular weight Polyisobutylene | BASF |
| M4 | ESCOREZ E5340 | A hydrogenated hydrocarbon tackfier | ExxonMobil Chemical Co., Houston, TX. |
| M5 | GLISSOPAL 1000 | A low molecular weight Polyisobutylene | BASF |
| M6 | 98:2 Isooctyl acrylate/acrylic acid copolymer | 98:2 Isooctyl acrylate, acrylic acid adhesive | The copolymer was prepared according to Polymerization Process A in WO0078884. |
| M7 | KEROCOM PIBA 03 (contains: 33% solvent ($C_{10}$-$C_{14}$ liquid paraffin), 13% hydrogenated polyisobutylene, and 54% of ~1000 g/mol of amine-terminated Polyisobutylene). PIBA 03 was used as received from BASF. | Functionalized Polyisobutylene | BASF |
| S1 | Glass, 5.08 cm × 15.2 cm × 0.635 cm (2" × 6", ¼") | Substrate | Brin Northwestern Glass Company, Minneapolis, MN |
| S2 | Porcelain | Substrate | Marazzi Montagna Soratta porcelain tile from Home Depot, Atlanta, GA |

TABLE 1-continued

Materials

| No. | Material | Function | Manufacturer |
|---|---|---|---|
| S3 | Acrylic | Substrate | ASB Firenze shower base from Home Depot |
| S4 | Polyethylene | Substrate | Cheminstruments, Fairfield, OH |
| S5 | Stainless steel | Substrate | Cheminstruments, Fairfield, OH |
| S6 | Primed EVA film | Adhesive carrier | Bloomer Plastics, Bloomer, WI |
| S7 | Clearsil ® T30 release liner | Adhesive carrier | CP Films, Inc., Martinsville, VA. |
| S8 | Clearsil ® T10 release liner | Adhesive carrier | CP Films, Inc., Martinsville, VA. |

Preparation of Adhesives

Adhesives were prepared by mixing appropriate material components as specified in Table 2. See Table 1 for description of material components used. Mixing containers were glass jars unless specified otherwise. All polyisobutylene polymers were used as toluene solutions. M1 and M2 were dissolved in toluene to provide 10 wt. % solutions. M0 and M3 were dissolved in toluene to provide 20 wt. % solutions. M6 was used as a 28% solids mixture in ethyl acetate/heptane. M5 and M7 were added to the adhesive formulations as supplied. M4 was added to the adhesive formulations as a white solid. After all the components had been added, the jars of adhesive formulations were sealed with a TEFLON-lined metal cap, TEFLON tape, and SCOTCH BRAND electrical tape and were mixed by rolling on rollers for 16 hours at ambient temperature. The adhesive solutions were then coated onto S7 using a knife coater. Samples of S7 with coated solutions were taped to a thin aluminum panel and were placed into an oven to be dried at 50° C. for 15 minutes followed by 70° C. for 30 minutes. The dried adhesive coatings on S7 were then allowed to equilibrate in a constant temperature/constant humidity room (50% relative humidity and 23° C.) for approximately 24 hours prior to laminating S8 release liner to the top of the adhesive. Unless stated otherwise, the dry coating thickness of the adhesives was 101 to 114 micrometers (4-4.5 mil.).

Before performing shower tests, the adhesives were laminated to S6. A portion of S6 was cut from the supply roll and fastened to the bench top. S8 liner was removed from the adhesive sample, and the adhesive side was then carefully laid down onto S6 surface. A plastic card was then used to squeeze out air bubbles. 2.54 cm (1 inch) Wide strips of the S6/adhesive/S7 construction were then laminated at 413 to 551 kPa (60-80 psi.) The samples were then allowed to dwell at ambient temperature for at least one hour before being cut to approximately 12.7 to 15.4 cm (5-6 inch) long by 2.54 cm (1 inch) wide strips.

Test Methods:

90° Angle Peel Adhesion Strength Test.

Evaluation of peel adhesion strength at an angle of 90° was performed as described in the ASTM International standard, D3330, Method F, with a 5.08 cm×15.2 cm (2 in.×6 in.) test specimen using an IMASS SP-2000 slip/peel tester (available from IMASS, Inc., Accord, Mass.) at a peel rate of 432 mm/minute (17 inches/minute) using a 11.34 Kg (25 lb) load cell. All peel tests were performed at 90 degrees using a 2 second delay. The peel rate was 43.18 cm (17 inches)/minute and the data was averaged over 20 seconds. The samples were adhered to the test substrates by rolling down the tapes with a 2.0 kg (4.5 lb.) rubber roller using 4 passes.

The test substrates were cleaned by spraying ethanol onto the surface and then wiping the surface clean using a paper towel. They were washed 2-4 times depending on the amount of residue that needed to be removed.

S7 was removed from the test strips and the S6/adhesive samples were then laminated to the test substrates using two passes with a 4.5 lb roller. A test strip was laminated to each 5.08 cm×15.2 cm×0.635 cm (2 in×6 in) substrate. The samples were then allowed to dwell for 30 minutes before being placed in the shower chamber which was an enclosure in which the samples were placed and subjected to the specified environmental conditions. Water was sprayed onto the substrates in the shower chamber and it was 46.67° C. (116° F.) at a pressure of 7.252 kPa (50 psi.). The temperature measured inside the shower chamber was 35.55° C. (96° F.).

The samples were left in the shower chamber for approximately 18-24 hours, after which time they were removed and gently dried with a paper towel. Peel tests were then performed on the adhesive samples within 5 minutes of being removed from the shower chamber. The average peel adhesion force required to remove the tape from the substrate was measured in ounces and is expressed in Oz/inch, based on 2 test samples. The results obtained are listed in Table 3.

TABLE 2

| Example No. | M0 B30 | M1 B150 | M2 B100 | M3 (B50) | M4 E5340 | M5 G1000 | M6 Acrylic Adh | M7 PIBA03 |
|---|---|---|---|---|---|---|---|---|
| Control 1 |  | 20 | 30 | 20 | 27.5 | 2.5 |  |  |
| Control 2 |  | 40 | 40 |  | 17.5 | 2.5 |  |  |
| Control 3 |  | 40 | 15 | 12.5 | 27.5 | 2.5 | 2.5 |  |
| Control 4 | 26.25 |  | 15 | 26.25 | 30 |  | 2.5 |  |
| Control 5 | 27.5 |  | 15 | 27.5 | 25 | 5 |  |  |
| Example 1 | 32.5 |  |  | 32.5 | 20 |  | 5 | 10 |
| Example 2 | 30 |  |  | 30 | 20 |  | 10 | 10 |
| Example 3 | 30 |  |  | 30 | 27 |  | 10 | 3 |
| Example 4 | 22.5 |  | 20 | 22.5 | 27.5 |  | 5 | 2.5 |
| Example 5 | 27.5 |  | 15 | 27.5 | 27.5 |  |  | 2.5 |
| Example 6 |  | 15 | 25 | 30 | 25 |  |  | 5 |
| Example 7 |  |  | 40 | 27.5 | 27.5 |  | 2.5 | 2.5 |
| Example 8 |  | 40 | 15 | 12.5 | 27.5 |  | 2.5 | 2.5 |
| Example 9 |  | 40 | 15 | 15 | 27.5 |  |  | 2.5 |

TABLE 3

| Example No. | S1 Glass | S2 Porcelain | S3 Acrylic | S4 Polyethylene | S5 Stainless Steel |
|---|---|---|---|---|---|
| Control 1 | 0.8 |  |  |  |  |
| Control 2 | 1.1 |  |  |  |  |
| Control 3 | 0.1 |  |  |  |  |
| Control 4 | 0.5 |  |  |  |  |
| Control 5 | 3 | 1 | 65 |  |  |
| Example 1 |  | 52 |  |  |  |
| Example 2 |  | 81 |  |  |  |
| Example 3 |  | 73 |  |  |  |
| Example 4 | 28 | 20 | 38 |  |  |
| Example 5 | 21 | 12 | 70 |  |  |
| Example 6 | 28 | 24 | 33 |  |  |
| Example 7 | 43 | 25 | 33 | 36 | 44 |
| Example 8 | 29 | 20 | 32 | 22 | 38 |
| Example 9 | 28 | 13 | 37 | 16 | 34 |

The invention claimed is:

1. An adhesive article comprising a substrate and a layer of pressure-sensitive adhesive on at least one surface of the substrate, the adhesive comprising:
   a) greater than 50 wt. % of a non-functional isobutylene (co)polymer,
   b) 0.25 to 20 wt. % of an amine-functional poly(isobutylene) polymer,
   c) 0.5 to 5 wt. % of an acid-functional (meth)acrylate copolymer,
   d) 0 to 40 wt. % of a tackifier; and
   e) 0 to 40 wt. % of a plasticizer;
   wherein the adhesive has a storage modulus of $3\times10^6$ dynes/cm$^2$ at room temperature and oscillation frequency of 1 Hz; and
   wherein the adhesive combined 25-35wt % of the amine-functional poly(isobutylene) polymer and the tackifier.

2. The adhesive article of claim 1 wherein the acid-functional (meth)acrylate copolymer comprises 80 to 99 wt. % of (meth)acrylic acid ester monomers and 1 to 20 wt. % of acid-functional monomers.

3. The adhesive article of claim 1 wherein said amine-functional poly(isobutylene) polymer has a number average molecular weight of less than 10,000 g/mole.

4. The adhesive article of claim 1 wherein the (meth)acrylic acid ester monomers is a $C_4$ to $C_{20}$ (meth)acrylic acid ester monomers.

5. The adhesive article of claim 4 wherein the (meth)acrylic acid ester monomers is a $C_4$ to $C_8$ (meth)acrylic acid ester monomer.

6. The adhesive article of claim 1 wherein the adhesive further comprises a tackifying resin, a plasticizer, or a mixture thereof.

7. The adhesive article of claim 1, wherein the amine-functional poly(isobutylene) polymer is of the general formula:

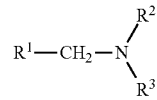

wherein
$R^1$ is a polymeric radical of isobutylene having 5 to 100 repeat units, and $R^2$ and $R^3$ are independently selected from H, $C_1$-$C_{10}$-alkyl or aryl groups.

8. The adhesive article of claim 1 wherein the adhesive comprises 1 to 15 wt. % of the amine-functional poly(isobutylene) polymer.

9. The adhesive article of claim 1 wherein the adhesive further comprises 1 to 40 wt. % tackifier.

10. The adhesive article of claim 1 wherein the substrate in a polymer film substrate.

11. The adhesive article of claim 1 wherein the substrate in a nonwoven substrate.

12. The adhesive article of claim 1 comprising a layer of the pressure-sensitive adhesive on a release liner substrate.

13. The adhesive article of claim 1 comprising layers of pressure-sensitive adhesive on two surfaces of the substrate.

14. The adhesive article of claim 1 wherein the substrate is a foam substrate.

* * * * *